US011251931B2

(12) United States Patent
Zhou et al.

(10) Patent No.: US 11,251,931 B2
(45) Date of Patent: Feb. 15, 2022

(54) ACTIVE TRANSMISSION CONFIGURATION INDICATION STATES

(71) Applicant: QUALCOMM Incorporated, San Diego, CA (US)

(72) Inventors: Yan Zhou, San Diego, CA (US); Tao Luo, San Diego, CA (US); Prashanth Haridas Hande, San Diego, CA (US); Wanshi Chen, San Diego, CA (US); Heechoon Lee, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/675,129

(22) Filed: Nov. 5, 2019

(65) Prior Publication Data

US 2020/0145172 A1 May 7, 2020

Related U.S. Application Data

(60) Provisional application No. 62/757,104, filed on Nov. 7, 2018.

(51) Int. Cl.
*H04L 5/00* (2006.01)
*H04B 7/06* (2006.01)
(Continued)

(52) U.S. Cl.
CPC ......... *H04L 5/0098* (2013.01); *H04B 7/0686* (2013.01); *H04W 48/06* (2013.01);
(Continued)

(58) Field of Classification Search
CPC .... H04B 7/0686; H04L 5/0098; H04W 48/06; H04W 72/042; H04W 72/046; H04W 76/36; H04W 80/02
See application file for complete search history.

(56) References Cited

U.S. PATENT DOCUMENTS 10,506,587 B2 * 12/2019 Guo ................... H04W 72/046
10,701,679 B2 * 6/2020 Vilaipornsawai ..... H04L 1/1819
(Continued)

FOREIGN PATENT DOCUMENTS

CN 110830203 A * 2/2020
CN 111615805 A * 9/2020 .......... H04W 72/042
(Continued)

OTHER PUBLICATIONS

Nokia et al., Offline discussion summary on QCL, Apr. 16, 2018, 3GPP TSG RAN WG1#92bis, Tdoc: R1-1805690 (Year: 2018).*
(Continued)

*Primary Examiner* — Eric Nowlin
(74) *Attorney, Agent, or Firm* — Holland & Hart LLP

(57) ABSTRACT

Methods, systems, and devices for wireless communication are described. Generally, the described techniques provide for limiting a number of active beams available for communications between a user equipment (UE) and a base station (e.g., to limit the complexity at the UE). In one example, transmission configuration indication (TCI) states may correspond to active beams available for downlink reception that are identified based on configured quasi co-location (QCL) relationships and active QCL assumptions (i.e., the TCI states may include configured QCL relationships and QCL assumptions). Because the TCI states may include configured QCL relationships and active QCL assumptions, the number of active beams available for communications between a UE and a base station may be limited by the number of active TCI states (e.g., where the number of active TCI states may be determined based on a UE capability).

26 Claims, 13 Drawing Sheets

(51) Int. Cl.
*H04W 72/04* (2009.01)
*H04W 76/36* (2018.01)
*H04W 48/06* (2009.01)
*H04W 80/02* (2009.01)

(52) U.S. Cl.
CPC ....... *H04W 72/042* (2013.01); *H04W 72/046* (2013.01); *H04W 76/36* (2018.02); *H04W 80/02* (2013.01)

(56) References Cited

U.S. PATENT DOCUMENTS

| | | | | |
|---|---|---|---|---|
| 11,026,224 | B2* | 6/2021 | Vilaipornsawai | H04L 1/1819 |
| 11,115,970 | B2* | 9/2021 | Zhou | H04W 72/042 |
| 2018/0343653 | A1* | 11/2018 | Guo | H04L 5/0053 |
| 2019/0132827 | A1* | 5/2019 | Kundargi | H04B 7/088 |
| 2019/0141691 | A1* | 5/2019 | Kwon | H04W 72/12 |
| 2019/0373450 | A1* | 12/2019 | Zhou | H04W 72/046 |
| 2020/0015200 | A1* | 1/2020 | Vilaipornsawai | H04L 25/0204 |
| 2020/0044797 | A1* | 2/2020 | Guo | H04W 72/048 |
| 2020/0052803 | A1* | 2/2020 | Deenoo | H04W 74/0816 |
| 2020/0053717 | A1* | 2/2020 | Zhou | H04W 36/36 |
| 2020/0120644 | A1* | 4/2020 | Zhou | H04L 5/0048 |
| 2020/0145172 | A1* | 5/2020 | Zhou | H04W 80/02 |
| 2020/0145983 | A1* | 5/2020 | Levitsky | H04W 56/001 |
| 2020/0204234 | A1* | 6/2020 | Zhu | H04B 7/088 |
| 2020/0204246 | A1* | 6/2020 | Zhou | H04W 72/042 |
| 2020/0204247 | A1* | 6/2020 | Zhou | H04L 27/2675 |
| 2020/0229161 | A1* | 7/2020 | Raghavan | H04L 5/0091 |
| 2020/0267571 | A1* | 8/2020 | Park | H04W 72/046 |
| 2020/0296704 | A1* | 9/2020 | Vilaipornsawai | H04L 5/0094 |
| 2020/0314676 | A1* | 10/2020 | Lin | H04L 5/0053 |
| 2020/0351842 | A1* | 11/2020 | Lin | H04W 24/10 |
| 2020/0359459 | A1* | 11/2020 | Kakishima | H04L 5/0023 |
| 2020/0383096 | A1* | 12/2020 | Yang | H04W 72/0406 |
| 2020/0389883 | A1* | 12/2020 | Faxer | H04L 5/0048 |
| 2020/0389884 | A1* | 12/2020 | Hakola | H04W 36/305 |
| 2021/0014848 | A1* | 1/2021 | Davydov | H04L 5/001 |
| 2021/0014884 | A1* | 1/2021 | Yang | H04W 72/046 |
| 2021/0045149 | A1* | 2/2021 | Davydov | H04L 5/0023 |
| 2021/0051692 | A1* | 2/2021 | Chen | H04W 72/1289 |
| 2021/0067979 | A1* | 3/2021 | Rahman | H04W 16/28 |
| 2021/0076391 | A1* | 3/2021 | Davydov | H04L 5/0057 |
| 2021/0084623 | A1* | 3/2021 | Zhang | H04W 72/042 |
| 2021/0092003 | A1* | 3/2021 | Zhou | H04W 72/14 |
| 2021/0092729 | A1* | 3/2021 | Ryu | H04W 8/22 |

FOREIGN PATENT DOCUMENTS

| | | | | |
|---|---|---|---|---|
| EP | | 3741066 A1 * | 11/2020 | H04L 5/0023 |
| WO | WO-2019143900 A1 * | | 7/2019 | H04L 1/1854 |
| WO | WO-2021090297 A1 * | | 5/2021 | H04L 5/0044 |

OTHER PUBLICATIONS

OPPO, Text Proposal for QCL, Feb. 26, 2018, 3GPP TSG RAN WG1 Meeting #92, Tdoc: R1-1802131 (Year: 2018).*
Intel Corporation, Corrections to QCL for NR, Feb. 26, 2018, 3GPP TSG RAN WG1 Meeting #92, Tdoc: R1-1802405 (Year: 2018).*
Nokia et al., TP on QCL, Feb. 26, 2018, 3GPP TSG RAN WG1 Meeting #92, Tdoc: R1-1802564 (Year: 2018).*
Ericsson, Corrections Related to QCL, Feb. 26, 2018, 3GPP TSG RAN WG1 Meeting #92, Tdoc: R1-1802758 (Year: 2018).*
Qualcomm Incorporated, Remaining Details on QCL, Feb. 26, 2018, 3GPP TSG RAN WG1 Meeting #92, Tdoc: R1-1802832 (Year: 2018).*
ZTE, Updates on QCL parameters in TCI, Feb. 26, 2018, 3GPP TSG RAN WG1 Meeting #92, Tdoc: R1-1803407 (Year: 2018 ).*
Nokia et al., Further proposals on QCL, Feb. 26, 2018, 3GPP TSG RAN WG1 Meeting #92, Tdoc: R1-1803414 (Year: 2018).*
Huawei et al., Remaining issues and TP for QCL assumptions, Apr. 16, 2018, 3GPP TSG RAN WG1 Meeting #92bis, Tdoc: R1-1803640 (Year: 2018).*
Huawei et al., QCL and spatial-relation for simultaneous reception and transmission, Apr. 16, 2018, 3GPP TSG RAN WG1 Meeting #92bis, Tdoc: R1-1803701 (Year: 2018).*
CATT, Remaining issues on QCL, Apr. 16, 2018, 3GPP TSG RAN WG1 Meeting #92bis, Tdoc: R1-1803750 (Year: 2018).*
Vivo, Remaining Issues on QCL, Apr. 16, 2018, 3GPP TSG RAN WG1 Meeting #92bis, Tdoc: R1-1803827 (Year: 2018).*
ITRI, Discussion on QCL across CCs, Apr. 16, 2018, 3GPP TSG RAN WG1 Meeting #92bis, Tdoc: R1-1803964 (Year: 2018).*
OPPO, Text Proposal for QCL, Apr. 16, 2018, 3GPP TSG RAN WG1 Meeting #92bis, Tdoc: R1-1804004 (Year: 2018).*
MediaTek Inc., Views on Multi-CC QCL Assumptions, Apr. 16, 2018, 3GPP TSG RAN WG1 Meeting #92bis, Tdoc: R1-1804060 (Year: 2018).*
Intel Corporation, Corrections to QCL for NR, Apr. 16, 2018, 3GPP TSG RAN WG1 Meeting #92bis, Tdoc: R1-1804724 (Year: 2018).*
Qualcomm Incorporated, Remaining Details on QCL, Apr. 16, 2018, 3GPP TSG RAN WG1 Meeting #92bis, Tdoc: R1-1804796 (Year: 2018).*
Ericsson, Remaining Issues on QCL, Apr. 16, 2018, 3GPP TSG RAN WG1 Meeting #92bis, Tdoc: R1-1804987 (Year: 2018).*
Nokia et al., Feature Lead Summary on QCL, Apr. 16, 2018, 3GPP TSG RAN WG1 Meeting #92bis, Tdoc: R1-1805660 (Year: 2018).*
Panasonic, QCL Related Issues During BWP Switching, May 21, 2018, 3GPP TSG-RAN WG1 Meeting #93, Tdoc: R1-1806390 (Year: 2018).*
Intel Corporation, On The Remaining Issues of QCL, May 21, 2018, 3GPP TSG-RAN WG1 Meeting #93, Tdoc: R1-1806515 (Year: 2018).*
MediaTek, Inc., Views on Multi-CC QCL Assumptions, May 21, 2018, 3GPP TSG-RAN WG1 Meeting #93, Tdoc: R1-1806790 (Year: 2018).*
Oppo, Text Proposal for QCL, May 21, 2018, 3GPP TSG-RAN WG1 Meeting #93, Tdoc: R1-1806844 (Year: 2018).*
Qualcomm Incorporated, Remaining Details on QCL, May 21, 2018, 3GPP TSG-RAN WG1 Meeting #93, Tdoc: R1-1807351 (Year : 2018).*
Nokia et al., Feature lead summary on QCL, May 21, 2018, 3GPP TSG-RAN WG1 Meeting #93, Tdoc: R1-1807664 (Year: 2018).*
Huawei et al., Remaining Issues on Reference Signals and QCL, Aug. 20, 2018, 3GPP TSG RAN WG1 Meeting #94, Tdoc: R1-1808144 (Year: 2018).*
ZTE, Maintenance for Reference Signals and QCL, Aug. 20, 2018, 3GPP TSG RAN WG1 Meeting #94, Tdoc: R1-1808197 (Year: 2018).*
Vivo, Remaining Issues on Reference Signals and QCL, Aug. 20, 2018, 3GPP TSG RAN WG1 Meeting #94, Tdoc: R1-1808222 (Year: 2018).*
Intel Corporation, Remaining Issues on Beam Management, Aug. 20, 2018, 3GPP TSG RAN WG1 Meeting #94, Tdoc: R1-1808669 (Year: 2018).*
Nokia et al., Feature Lead Summary on QCL, Aug. 20, 2018, 3GPP TSG RAN WG1 Meeting #94, Tdoc: R1-1809758 (Year: 2018).*
NTT DOCOMO, Inc., Discussion on Multi-Beam Enhancement, Oct. 8, 2018, 3GPP TSG RAN WG1 Meeting #94bis, Tdoc: R1-1811349 (Year: 2018).*
NTT DOCOMO, Inc., Remaining Issues on Beam Management, Oct. 8, 2018, 3GPP TSG RAN WG1 Meeting #94bis, Tdoc: R1-1811352 (Year: 2018).*
Huawei et al., Correction to the MAC CE of TCI States Activation and Deactivation for UE-specific PDSCH, May 21, 2018, 3GPP TSG-RAN WG2 Meeting #102, Tdoc: R2-1808754 (Year: 2018).*
Samsung, Extension of Maximum Numer of TCI States, Aug. 20, 2018, 3GPP TSG-RAN WG2#103, Tdoc: R2-1813363 (Year: 2018).*
Samsung Electronics, CR on Extension of Maximum Number of TCI States (Non-backward compatible), Aug. 20, 2018, 3GPP TSG-RAN WG2#103, Tdoc: R2-1813477 (Year: 2018).*
Vivo, On the TCI state configuration for CSS in "non-overlapping" BWP, Oct. 8, 2018, 3GPP TSG-RAN WG2 Meeting #103bis, Tdoc: R2-181xxxx (Year: 2018).*
Interdigital, et al., "Remaining Issues on Beam Management", 3GPP Draft, 3GPP TSG RAN WG1 Meeting #92, R1-1802620 Beam Management Final, 3rd Generation Partnership Project (3GPP),

(56) References Cited

OTHER PUBLICATIONS

Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398058, 6 Pages, Retrieved from the Internet: URL: http://www.3gpp.org/ftp/tsg%5Fran/WG1%5FRL1/TSGR1%5F92/Docs/ [retrieved on Feb. 17, 2018] the whole document.
International Search Report and Written Opinion—PCT/US2019/060064—ISA/EPO—dated Apr. 14, 2020.
Qualcomm Incorporated: "Beam Management for NR", 3GPP Draft, R1-1813396, Beam Management for NR, 3rd Generation Partnership Project (3GPP), Mobile Competence Centre, 650, Route Des Lucioles, F-06921 Sophia-Antipolis Cedex, France, vol. RAN WG2, No. Spokane, US, Nov. 12, 2019-Nov. 16, 2018, Nov. 3, 2018 (Nov. 3, 2018), XP051479713, 5 pages, Retrieved from the Internet: URL: http://ww.3gpp.org/ftp/tsg%5Fran/WG1%5FRL1/TSGR1%5F95/Docs/R1%2D1813396%2Ezip. [retrieved on Nov. 3, 2018] Clarification of Active TCI States p. 3, paragraph 5—p. 4.
Qualcomm Incorporated: "Beam Management for NR", 3GPP Draft, 3GPP TSG-RAN WG1 Meeting #94bis, R1-1811633, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 30, 2018 (Sep. 30, 2018), 13 pages, XP051519027, Retrieved from the Internet: URL: http://www.3gpp.org/ftp/tsg%5Fran/WG1%5FRL1/TSGR1%5F94b/Docs/R1%2D1811633%2Ezip [retrieved on Sep. 30, 2018], the whole document.
Qualcomm Incorporated: "Enhancements on Multi-beam Operation", 3GPP Draft, 3GPP TSG-RAN WG1 Meeting #95, R1-1813443 Enhancements on Multi-beam Operation, 3rd Generation Partnership Project (3GPP), Mobile Competence Centre, 650, Route Des Lucioles, F-06921 Sophia-Antipolis Cedex, France, vol. RAN WG1. No. Spokane, Washington, USA, Nov. 12, 2018-Nov. 16, 2018, Nov. 11, 2018 (Nov. 11, 2018), XP051555482, pp. 1-22, Retrieved from the Internet: URL: http://www.3gpp.org/ftp/Meetings%5F3GPP%5FSYNC/RAN1/Docs/R1%2D1813443%2Ezip, [retrieved on Nov. 11, 2018] Chapters: 3, 5, 7, 8.

* cited by examiner

ACTIVE TRANSMISSION CONFIGURATION INDICATION STATES

CROSS REFERENCE

The present application for patent claims the benefit of U.S. Provisional Patent Application No. 62/757,104 by ZHOU et al., entitled "ACTIVE TRANSMISSION CONFIGURATION INDICATION STATES," filed Nov. 7, 2018, assigned to the assignee hereof, which is hereby incorporated by reference in its entirety.

BACKGROUND

The following relates generally to wireless communications and more specifically to active transmission configuration indication (TCI) states.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support communications with a base station using one or more beams. In such systems, it may be appropriate for the UE to identify a beam to use for communicating with the base station from a number of active beams (e.g., for a control or data transmission). Conventional techniques for identifying active beams available for communicating with a base station may be deficient.

SUMMARY

The described techniques relate to improved methods, systems, devices, and apparatuses that support active transmission configuration indicator (TCI) states. Generally, the described techniques provide for limiting a number of active beams (e.g., TCI states) available for communications between a user equipment (UE) and a base station (e.g., to limit the complexity at the UE). In one example, TCI states may correspond to spatial parameters or active beams available for downlink reception that are identified based on configured quasi co-location (QCL) relationships and active QCL assumptions (i.e., the TCI states may include configured QCL relationships and QCL assumptions). Because the TCI states may include configured QCL relationships and active QCL assumptions, the number of active beams available for communications between a UE and a base station may be limited by the number of active TCI states (e.g., where the number of active TCI states may be determined based on a UE capability).

A method for wireless communication by a user equipment is described. The method may include receiving signaling indicating one or more TCI states corresponding to a first one or more beams, identifying one or more active QCL assumptions corresponding to a second one or more beams that differ from the first one or more beams, and monitoring for a transmission based on the first one or more beams or the second one or more beams.

An apparatus for wireless communication by a user equipment is described. The apparatus may include a processor, memory in electronic communication with the processor, and instructions stored in the memory. The instructions may be executable by the processor to cause the apparatus to receive signaling indicating one or more TCI states corresponding to a first one or more beams, identify one or more active QCL assumptions corresponding to a second one or more beams that differ from the first one or more beams, and monitor for a transmission based on the first one or more beams or the second one or more beams.

Another apparatus for wireless communication by a user equipment is described. The apparatus may include means for receiving signaling indicating one or more TCI states corresponding to a first one or more beams, identifying one or more active QCL assumptions corresponding to a second one or more beams that differ from the first one or more beams, and monitoring for a transmission based on the first one or more beams or the second one or more beams.

A non-transitory computer-readable medium storing code for wireless communication by a user equipment is described. The code may include instructions executable by a processor to receive signaling indicating one or more TCI states corresponding to a first one or more beams, identify one or more active QCL assumptions corresponding to a second one or more beams that differ from the first one or more beams, and monitor for a transmission based on the first one or more beams or the second one or more beams.

Some examples of the method, apparatuses, and non-transitory computer-readable medium described herein may further include operations, features, means, or instructions for transmitting a capability indicator indicating a number of supported beams, where a number of active TCI states may be equal to or less than the number of supported beams indicated by the capability indicator. In some examples of the method, apparatuses, and non-transitory computer-readable medium described herein, the active TCI states include the indicated one or more TCI states and the identified one or more QCL assumptions.

In some examples of the method, apparatuses, and non-transitory computer-readable medium described herein, identifying the one or more active QCL assumptions further may include operations, features, means, or instructions for selecting the second one or more beams in a random-access procedure. In some examples of the method, apparatuses, and non-transitory computer-readable medium described herein, identifying the one or more active QCL assumptions further may include operations, features, means, or instructions for receiving one or more medium access control (MAC) control elements (CEs) indicating the second one or more beams.

In some examples of the method, apparatuses, and non-transitory computer-readable medium described herein, the transmission may be a control transmission or a data transmission. In some examples of the method, apparatuses, and non-transitory computer-readable medium described herein, monitoring for the transmission further may include operations, features, means, or instructions for monitoring a physical downlink control channel for the transmission. In some examples of the method, apparatuses, and non-transitory computer-readable medium described herein, monitoring for the transmission further may include operations, features, means, or instructions for monitoring a physical downlink shared channel for the transmission. In some examples of the method, apparatuses, and non-transitory computer-readable medium described herein, the second one or more beams may be one or more downlink beams or one or more reference signal beams.

A method for wireless communication by a base station is described. The method may include transmitting signaling indicating one or more TCI states corresponding to a first one or more beams, identifying one or more active QCL assumptions corresponding to a second one or more beams that differ from the first one or more beams, and transmitting a transmission based on the first one or more beams or the second one or more beams.

An apparatus for wireless communication by a base station is described. The apparatus may include a processor, memory in electronic communication with the processor, and instructions stored in the memory. The instructions may be executable by the processor to cause the apparatus to transmit signaling indicating one or more TCI states corresponding to a first one or more beams, identify one or more active QCL assumptions corresponding to a second one or more beams that differ from the first one or more beams, and transmit a transmission based on the first one or more beams or the second one or more beams.

Another apparatus for wireless communication by a base station is described. The apparatus may include means for transmitting signaling indicating one or more TCI states corresponding to a first one or more beams, identifying one or more active QCL assumptions corresponding to a second one or more beams that differ from the first one or more beams, and transmitting a transmission based on the first one or more beams or the second one or more beams.

A non-transitory computer-readable medium storing code for wireless communication by a base station is described. The code may include instructions executable by a processor to transmit signaling indicating one or more TCI states corresponding to a first one or more beams, identify one or more active QCL assumptions corresponding to a second one or more beams that differ from the first one or more beams, and transmit a transmission based on the first one or more beams or the second one or more beams.

Some examples of the method, apparatuses, and non-transitory computer-readable medium described herein may further include operations, features, means, or instructions for receiving a capability indicator indicating a number of supported beams, where a number of active TCI states may be equal to or less than the number of supported beams indicated by the capability indicator. In some examples of the method, apparatuses, and non-transitory computer-readable medium described herein, the active TCI states include the indicated one or more TCI states and the identified one or more QCL assumptions.

In some examples of the method, apparatuses, and non-transitory computer-readable medium described herein, identifying the one or more active QCL assumptions further may include operations, features, means, or instructions for identifying selection of the second one or more beams in a random-access procedure. In some examples of the method, apparatuses, and non-transitory computer-readable medium described herein, identifying the one or more active QCL assumptions further may include operations, features, means, or instructions for transmitting one or more MAC-CEs indicating the second one or more beams.

In some examples of the method, apparatuses, and non-transitory computer-readable medium described herein, the transmission may be a control transmission or a data transmission. In some examples of the method, apparatuses, and non-transitory computer-readable medium described herein, transmitting the transmission further may include operations, features, means, or instructions for transmitting the transmission via a physical downlink control channel. In some examples of the method, apparatuses, and non-transitory computer-readable medium described herein, transmitting the transmission further may include operations, features, means, or instructions for transmitting the transmission via a physical downlink shared channel. In some examples of the method, apparatuses, and non-transitory computer-readable medium described herein, the second one or more beams may be one or more downlink beams or one or more reference signal beams.

DETAILED DESCRIPTION

Figure 1:
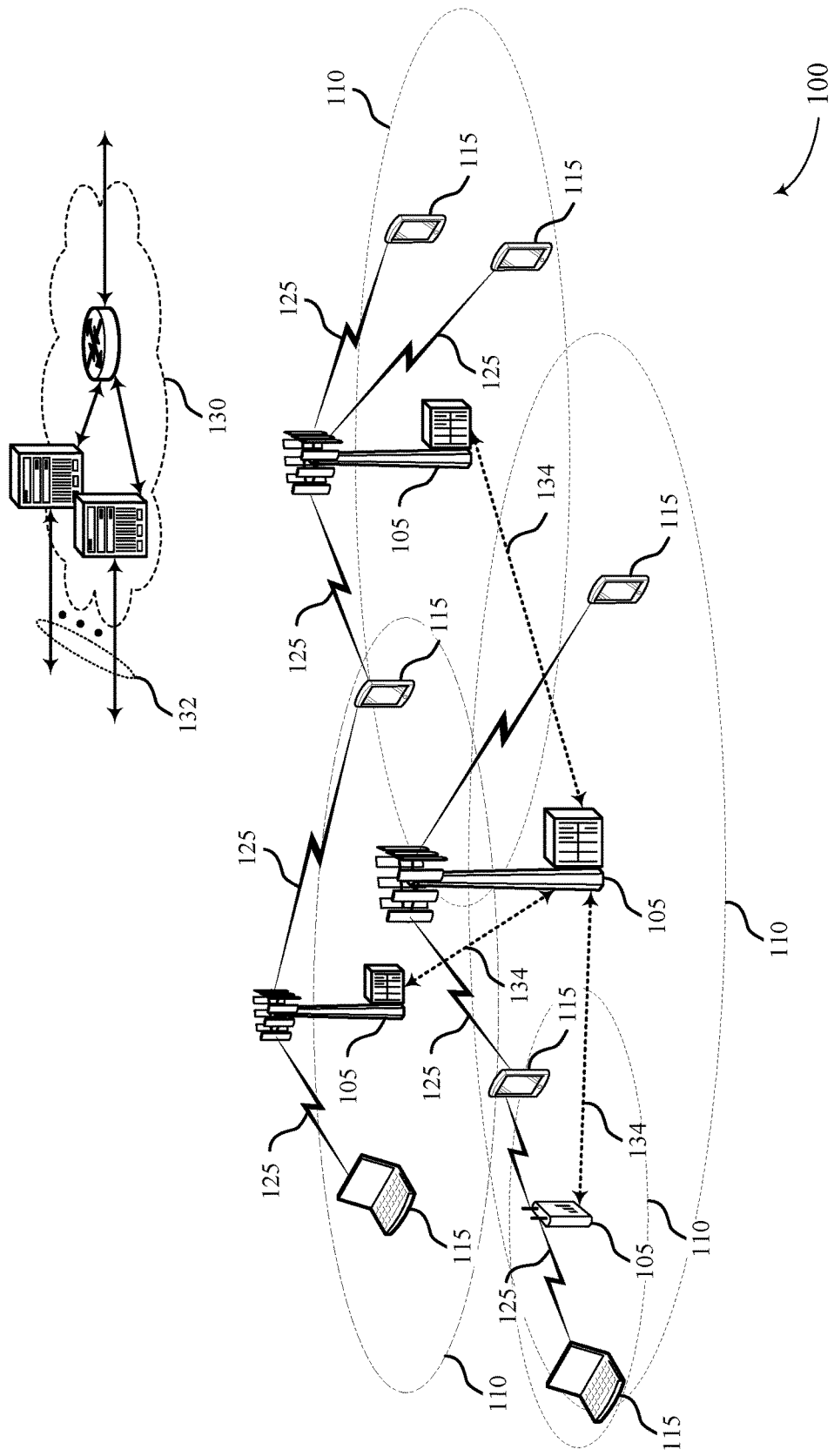
FIGS. 1 and 2 illustrate examples of wireless communications systems that support active transmission configuration indication (TCI) states in accordance with aspects of the present disclosure.

In some wireless communications systems, a base station may communicate with a user equipment (UE) using one or more beams. In such systems, it may be appropriate for a UE to identify a suitable beam or suitable spatial parameters for communicating with the base station (e.g., for transmitting or receiving a control or data transmission). Accordingly, for a scheduled downlink transmission, a base station may transmit an indication to a UE of a quasi co-location (QCL) relationship between a reference signal transmission and the scheduled downlink transmission, and the UE may determine that a beam (or spatial parameters) used to receive the reference signal transmission is suitable for receiving the scheduled downlink transmission (e.g., since the reference signal transmission and the scheduled downlink transmission may be quasi co-located). Such an indication may be referred to as a transmission configuration indication (TCI)

and may be received in downlink control information (DCI) from a base station used to schedule the downlink transmission. Different TCI states (e.g., different values of the TCI) may correspond to QCL relationships with different reference signal transmissions (e.g., may correspond to beams used to transmit different reference signals).

In some aspects, the number of TCI states configured to be indicated by DCI may be limited based on UE capability. Since TCI states may correspond to active beams available for downlink reception based on configured QCL relationships, and the number of TCI states may be limited, the number of active beams available for downlink reception may be limited (e.g., by the number of TCI states). By limiting the number of active beams, the complexity at a UE associated with identifying a beam for communicating with a base station may be reduced. In some cases, however, a UE may identify additional active beams (e.g., different from the beams indicated by the TCI states) available for communicating with a base station based on QCL assumptions. In such cases, the UE may identify QCL assumptions based on beams selected in a random-access channel (RACH) procedure or indicated by a base station. In conventional systems, the number of active beams available for communicating with a base station that are identified based on QCL assumptions may not be limited, which may result in increased complexity at a UE, and the UE may not be capable of managing such increased complexity.

As described herein, a wireless communications system may support efficient techniques for limiting a number of active beams available for communications between a UE and a base station (e.g., to limit the complexity at the UE). In one example, TCI states may correspond to active beams available for downlink reception that are identified based on configured QCL relationships and QCL assumptions. That is, the active TCI states may include active QCL assumptions to effectively limit the number of active beams (e.g., when selected TCI states for downlink control and data transmissions contain aperiodic channel state information reference signals (A-CSI-RSs)). In this example, the limited number of TCI states (e.g., determined based on UE capability) may, by extension, limit the number of active beams available for downlink reception that are identified based on configured QCL relationships and QCL assumptions. In other examples, the number of active beams available for downlink reception that are identified based on QCL assumptions may be limited using other techniques.

Aspects of the disclosure introduced above are described below in the context of a wireless communications system. Examples of processes and signaling exchanges that support active TCI states are then described. Aspects of the disclosure are further illustrated by and described with reference to apparatus diagrams, system diagrams, and flowcharts that relate to active TCI states.

FIG. 1 illustrates an example of a wireless communications system 100 that supports active TCI states in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., on a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI).

In other cases, a smallest scheduling unit of the wireless communications system 100 may be shorter than a subframe or may be dynamically selected (e.g., in bursts of shortened TTIs (sTTIs) or in selected component carriers using sTTIs).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

As mentioned above, in wireless communications system 100, a base station 105 may communicate with a UE 115 using one or more beams. In this system, it may be appropriate for a UE 115 to identify a suitable beam or suitable spatial parameters (e.g., delay spread, Doppler shift, etc.) for communicating with the base station 105 (e.g., for transmitting or receiving a control or data transmission). Accordingly, for a scheduled downlink transmission, the base station 105 may transmit an indication to the UE 115 of a QCL relationship between a reference signal transmission and the scheduled downlink transmission, and the UE 115 may determine that a beam (or spatial parameters) used to receive the reference signal transmission is suitable for receiving the scheduled downlink transmission (e.g., since the reference signal transmission and the scheduled downlink transmission may be quasi co-located). Such an indication may be referred to as a TCI and may be received in DCI from a base station used to schedule the downlink transmission. Different TCI states (e.g., different values of the TCI) may correspond to QCL relationships with different reference signal transmissions (e.g., may correspond to beams or spatial parameters used to transmit different reference signals).

In some aspects, the number of TCI states configured to be indicated by DCI may be limited based on UE capability. Since TCI states may correspond to active beams available for downlink reception based on configured QCL relationships, and the number of TCI states may be limited, the number of active beams available for downlink reception may be limited (e.g., by the number of TCI states). By limiting the number of active beams, the complexity at a UE 115 associated with identifying a beam for communicating with a base station 105 may be reduced. In some cases, however, a UE 115 may identify additional active beams (e.g., different from the beams indicated by the TCI states) available for communicating with a base station 105 based on QCL assumptions (i.e., active QCL assumptions may be applied for active transmissions of downlink data or control information). In such cases, the UE 115 may identify QCL assumptions based on beams selected in a RACH procedure or indicated by a base station 105. In conventional systems, the number of active beams available for communicating with a base station 105 that are identified based on QCL assumptions may not be limited, which may result in increased complexity at a UE 115, and the UE 115 may not be capable of managing such increased complexity. As described herein, wireless communications system 100 may support efficient techniques for limiting a number of active beams available for communications between a UE 115 and a base station 105 (e.g., to limit the complexity at the UE 115).

Figure 2:
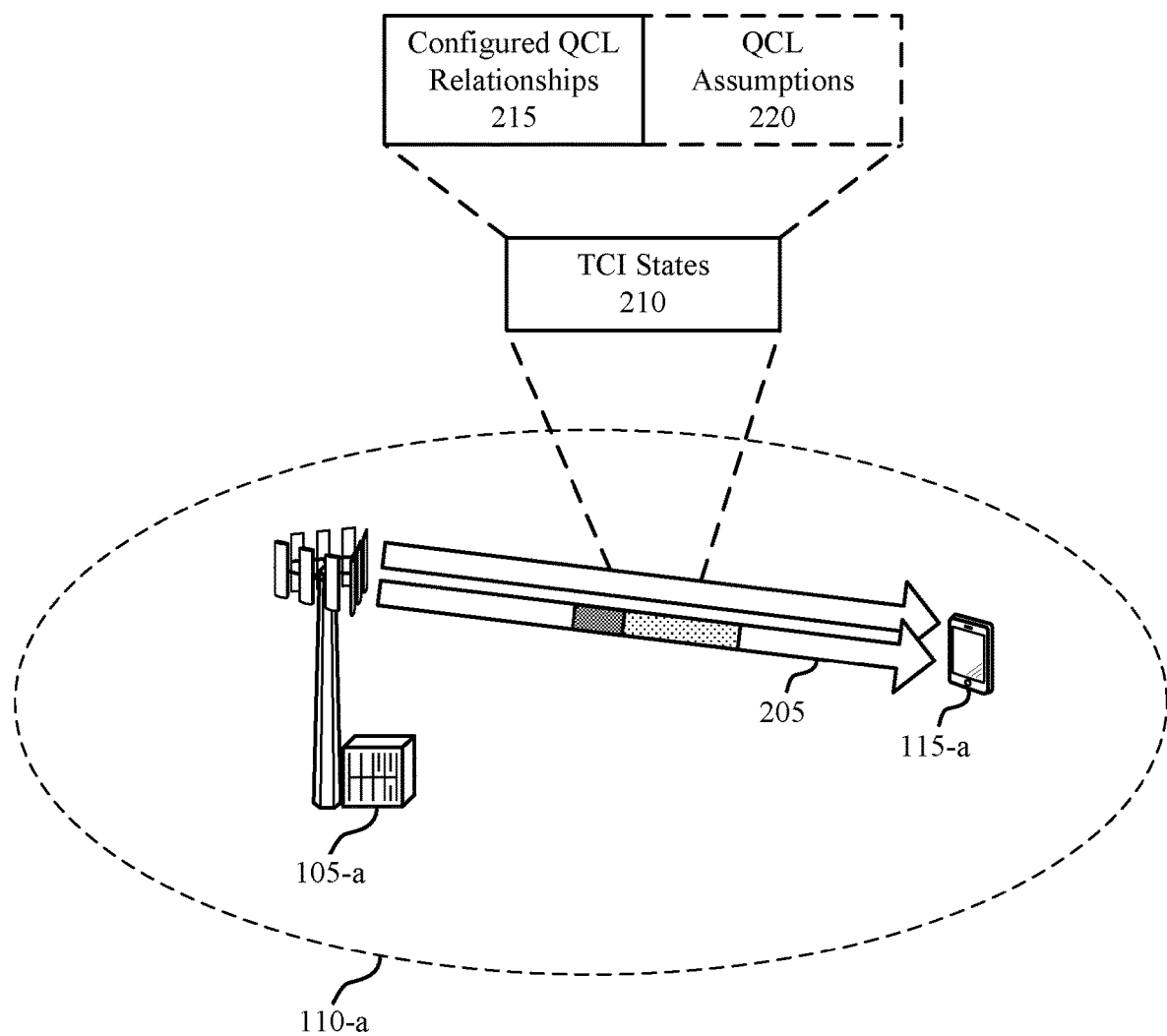

FIG. 2 illustrates an example of a wireless communications system 200 that supports active TCI states in accordance with aspects of the present disclosure. Wireless communications system 200 includes base station 105-a, which may be an example of a base station 105 described with reference with FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Base station 105-a may communicate with UE 115-a on resources of a carrier 205.

Wireless communications system 200 may implement aspects of wireless communications system 100. For instance, wireless communications system 200 may support efficient techniques for limiting a number of active beams available for communications between UE 115-a and base station 105-a (e.g., to limit complexity at UE 115-a). In the example of FIG. 2, base station 105-a may transmit (e.g., via RRC signaling) an indication of active TCI states 210 (e.g., or a subset of active TCI states corresponding to configured QCL relationships 215). As described herein, in one example, the active TCI states 210 may correspond to active beams available for downlink reception (e.g., PDCCH 225 and/or PDSCH 230 reception) that are identified based on configured QCL relationships 215 and active QCL assumptions 220. That is, the TCI states 210 may include configured QCL relationships 215 indicated by the base station 105-a (e.g., a subset of the TCI states 210) and QCL assumptions 220.

The configured QCL relationships 215 may correspond to active beams associated with a number (e.g., 64) of candidate TCI states (e.g., 64 candidate TCI states), and the QCL assumptions 220 may correspond to active beams different from the active beams associated with the candidate TCI states. That is, the active QCL assumptions 220 may include one or more downlink beam(s) and/or one or more reference signal transmissions other than an indicated active TCI state. As such, it is understood that if one or more TCI states correspond to a first one or more beams (or spatial parameters) and one or more active QCL assumptions correspond to a second one or more beams (or spatial parameters), the first one or more beams (or spatial parameters) is considered to be different from the second one or more beams (or spatial parameters) so long as the second one or more beams (or spatial parameters) includes at least one beam (or spatial parameter) that is not within the first one or more beams (or spatial parameters). For instance, the QCL assumptions 220 may correspond to beams selected in a random-access procedure, beams indicated in a MAC control element (MAC-CE), etc.

The beams selected in the random-access procedure may be selected as part of a beam failure recovery (BFR) procedure. In some cases, all uplink and downlink beams may correspond to the beams selected in the random-access procedure until the beams are reconfigured (i.e., previous beam indications are overwritten by the beams selected in the random-access procedure). The UE 115-a may at least apply the active QCL assumptions for active PDCCH and/or PDSCH transmissions. Since the TCI states 210 may correspond to beams available for downlink reception identified based on configured QCL relationships 215 and active QCL assumptions 220, and the TCI states 210 may be limited based on UE capability, the number of beams available for downlink reception may be limited by the number of TCI states 210 and, by extension, based on UE capability (e.g., where UE capability may be determined by base station 105-a based on a capability indicator received from UE 115-a).

In another example, instead of limiting the number of active beams by limiting the number of TCI states, base station 105-a may limit the number of active beams explicitly (e.g., based on UE capability, which may be determined by base station 105-a from a capability indicator received from UE 115-a). In this example, base station 105-a may maintain a parameter corresponding to the maximum number of active beams to be made available to UE 115-a for downlink reception. Accordingly, the number of beams corresponding to TCI states and the number of beams corresponding to QCL assumptions (e.g., identified by the UE 115-a) may not be greater than the maximum number of active beams. In some cases, however, to facilitate the techniques described in this example, the complexity associated with limiting the number of active beams made available to UE 115-a may be increased.

In yet another example, instead of limiting the number of active beams by limiting the number of TCI states, base station 105-a may limit the number of active beams by limiting the number of TCI states and limiting the number of beams identified based on QCL assumptions (e.g., based on UE capability, which may be determined by base station 105-a from a capability indicator received from UE 115-a). In this example, base station 105-a may maintain a parameter corresponding to the maximum number of active beams to be identified based on QCL assumptions (e.g., in addition to the parameter corresponding to the maximum number of active TCI states). Accordingly, the number of beams corresponding to TCI states may not be greater than the maximum number of TCI states, and the number of beams corresponding to QCL assumptions may not be greater than the maximum number of active beams to be identified based on QCL assumptions. In some cases, however, to facilitate the techniques described in this example, the complexity associated with limiting the number of active beams made available to UE 115-a may be increased.

Figure 3:
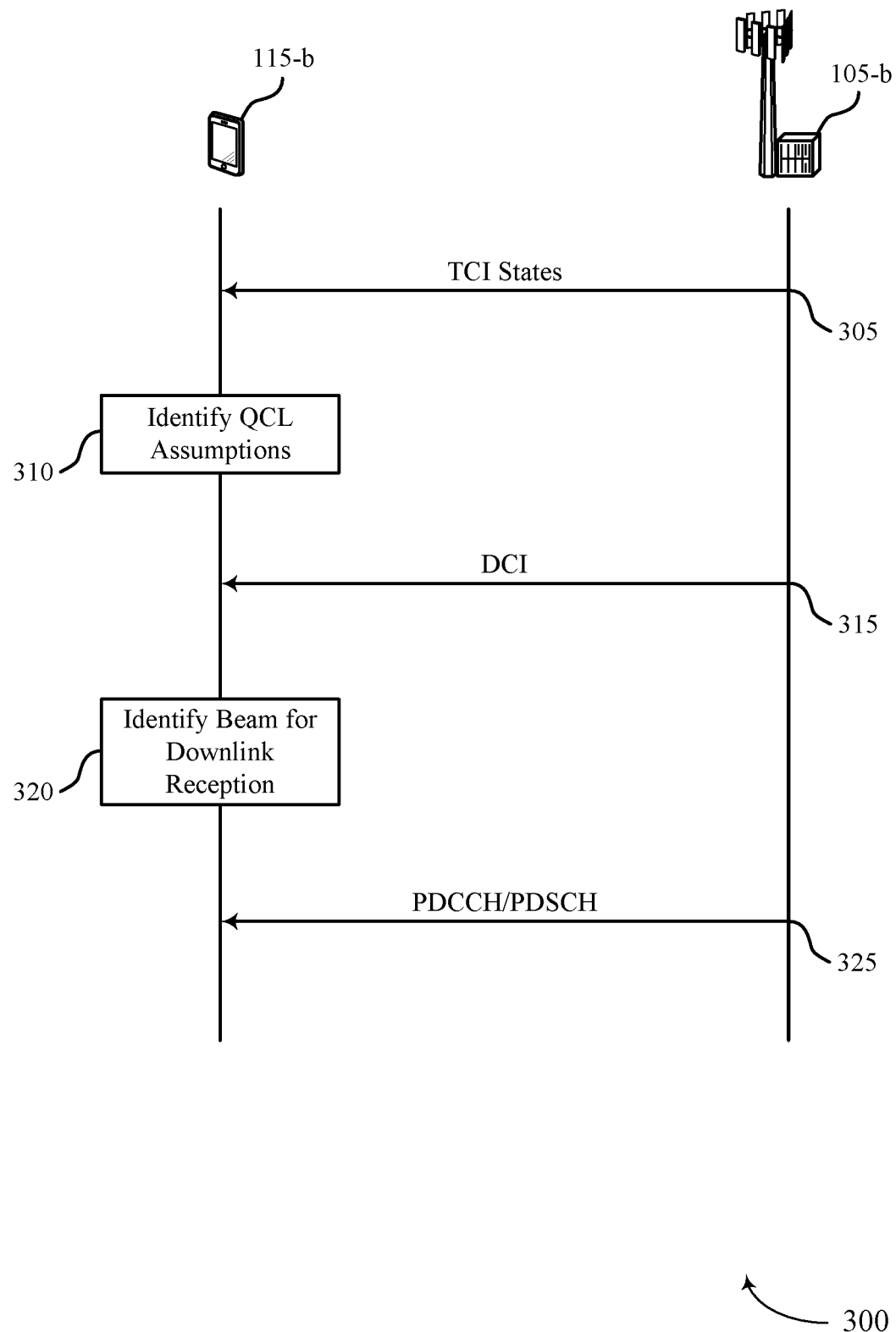
FIG. 3 illustrates an example of a process flow that supports active TCI states in accordance with aspects of the present disclosure.

FIG. 3 illustrates an example of a process flow 300 that supports active TCI states in accordance with aspects of the present disclosure. Process flow 300 illustrates aspects of techniques performed by a base station 105-b, which may be an example of a base station 105 described with reference to FIGS. 1 and 2. Process flow 300 also illustrates aspects of techniques performed by a UE 115-b, which may be an example of a UE 115 described with reference to FIGS. 1 and 2.

At 305, base station 105-b may transmit signaling (e.g., RRC signaling) indicating one or more active TCI states (e.g., or a subset of active TCI states) corresponding to a first one or more beams. At 310, UE 115-b may identify one or more QCL assumptions corresponding to a second one or more beams that differ from the first one or more beams. As described herein, the TCI states may correspond to active beams available for downlink reception that are identified based on configured QCL relationships (e.g., of candidate TCI states) and active QCL assumptions. That is, the TCI states may correspond to active beams or spatial parameters identified based on QCL relationships configured at 305 and QCL assumptions identified at 310. In some examples, the base station 105-b may transmit an indicator (e.g., activate a downlink beam number) that indicates an active TCI state and an active QCL assumption. The UE 115-b may, for example, index a locally stored table using the received indicator to identify an active TCI state and an active QCL assumption (e.g., based on the active TCI state).

In some cases, UE 115-b may select the second one or more beams in a random-access procedure, and UE 115-b may identify the QCL assumptions based on selecting the second one or more beams in the random-access procedure. That is, the identified QCL assumptions may indicate that the second one or more beams selected in a random-access procedure are quasi co-located with beams to be used to receive a scheduled downlink transmission. In other cases, UE 115-b may receive one or more MAC-CEs indicating the second one or more beams, and the UE 115-b may identify the QCL assumptions based on receiving the MAC-CEs indicating the second one or more beams. That is, the identified QCL assumptions may indicate that the second one or more beams indicated in the, e.g., one or more MAC-CEs are quasi co-located with beams to be used to receive a scheduled downlink transmission. In some cases, UE 115-b may transmit a capability indicator indicating a number of supported beams, where a number of the one or more active TCI states is equal to or less than the number of supported beams indicated by the capability indicator. In some cases, the capability indicator may indicate an active QCL assumption.

At 315, base station 105-b may then transmit DCI to UE 115-b to schedule a downlink transmission. The DCI may indicate a TCI state which may correspond to a beam for UE 115-b to use for downlink reception. At 320, UE 115-b may then identify a beam for downlink reception (e.g., based on the TCI state), and, at 325, UE 115-b may monitor for and receive the downlink transmission (e.g., PDCCH or PDSCH transmission) from base station 105-b using the identified beam.

Although the example described above with reference to FIG. 3 relates to a downlink transmission from a base station 105-b to a UE 115-b, it is to be understood that the same or similar techniques may be applied for an uplink transmission from the UE 115-b to the base station 105-b. In one example, active spatial relations may correspond to beams available for uplink reception that are identified based on configured QCL relationships (e.g., associated with a number of candidate spatial relations) and active QCL assumptions. For instance, active spatial relations may include active uplink beams indicated other than spatial relations. That is, the active TCI states for uplink (e.g., transmission and reception) may include configured QCL relationships and QCL assumptions. The QCL assumptions may correspond to beams selected in a random-access procedure, beams indicated in a MAC-CE, etc. (e.g., where active QCL assumptions may be applied for active transmissions of uplink data, uplink control information, sounding reference signals (SRSs), etc.). In some examples, the UE 115-b may apply active spatial relations to PUCCH transmissions, SRS transmission for PUSCH, or the like.

Further, in addition to the above techniques for limiting a number of active beams available for communications between a UE 115 and a base station 105, it may be appropriate, in some cases, to support techniques for limiting the number of TCI states that may be triggered using DCI. In one example, a UE 115 may support a single active TCI. In this example, if a selected TCI state (e.g., the single active TCI state) contains an aperiodic channel state information reference signal (A-CSI-RS), the A-CSI-RS may be configured (e.g., only configured) with the single TCI state available for DCI triggering (e.g., since the UE 115 may not be capable of supporting a high number of TCI states (e.g., 64) to allow a high number of TCI states to be available for DCI triggering).

For instance, if a UE 115 is configured with a single active TCI state, and the single active TCI state indicates that A-CSI-RS transmissions are quasi co-located with scheduled transmissions, other TCI states may not indicate that A-CSI-RS transmissions are quasi co-located with scheduled transmissions (e.g., the A-CSI-RS can only be configured with the single TCI state available for DCI triggering). In some cases, a UE 115 may identify that a single active TCI state is configured for transmitting or receiving a scheduled transmission, where the single active TCI state includes an A-CSI-RS. In such cases, the UE 115 may identify a beam or spatial parameters for transmitting or receiving the scheduled transmission based on the single TCI state, where other TCI states may fail to include A-CSI-RSs based on the single active TCI state including the A-CSI-RS, and the UE 115 may transmit or receive the scheduled transmission using the identified beam or spatial parameters.

Figure 4:
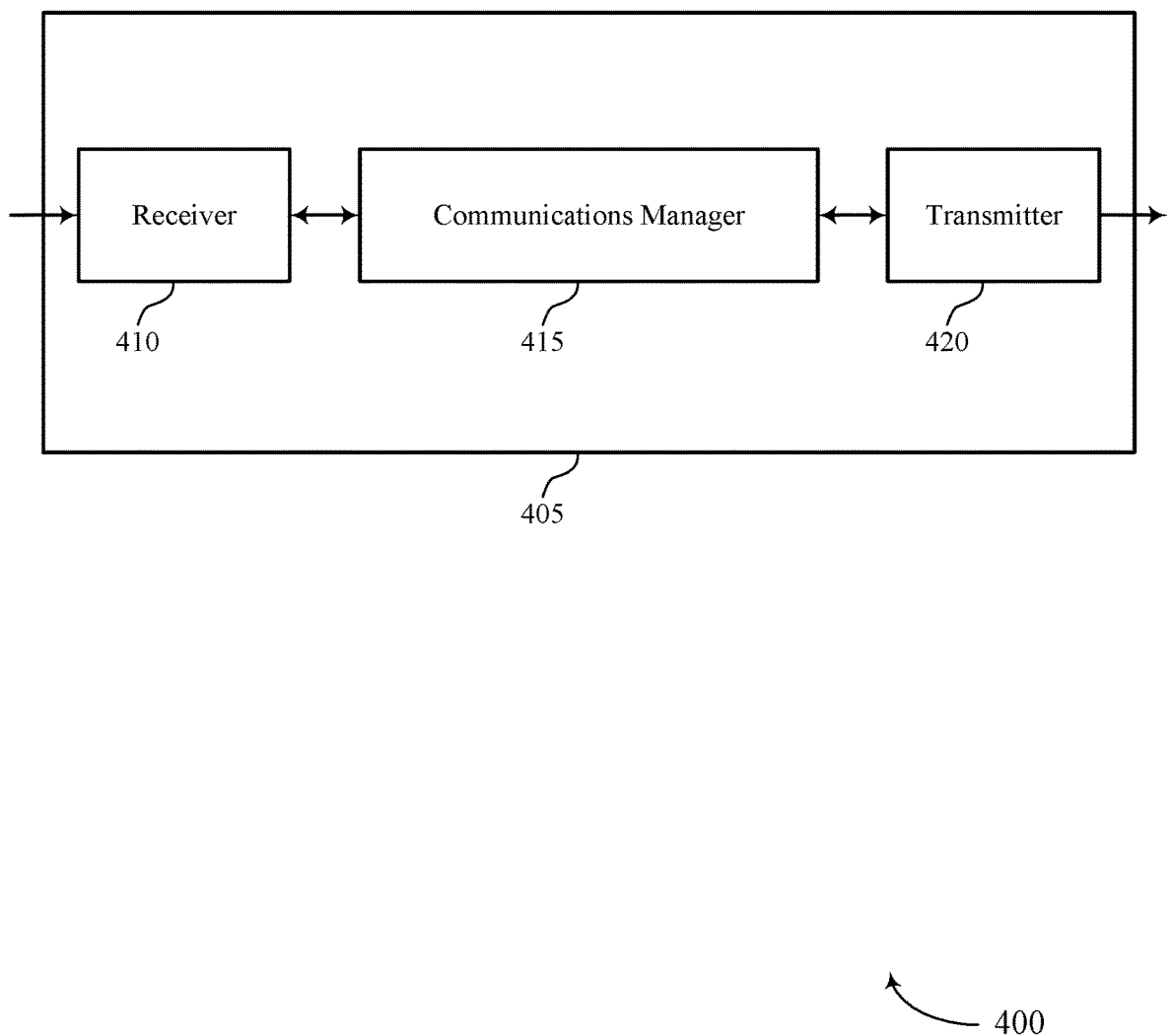
FIGS. 4 and 5 show block diagrams of devices that support active TCI states in accordance with aspects of the present disclosure.

FIG. 4 shows a block diagram 400 of a device 405 that supports active TCI states in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to active TCI states, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive signaling indicating one or more TCI states corresponding to a first one or more beams, identify one or more active QCL assumptions corresponding to a second one or more beams that differ from the first one or more beams, and monitor for a transmission based on the first one or more beams or the second one or more beams. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
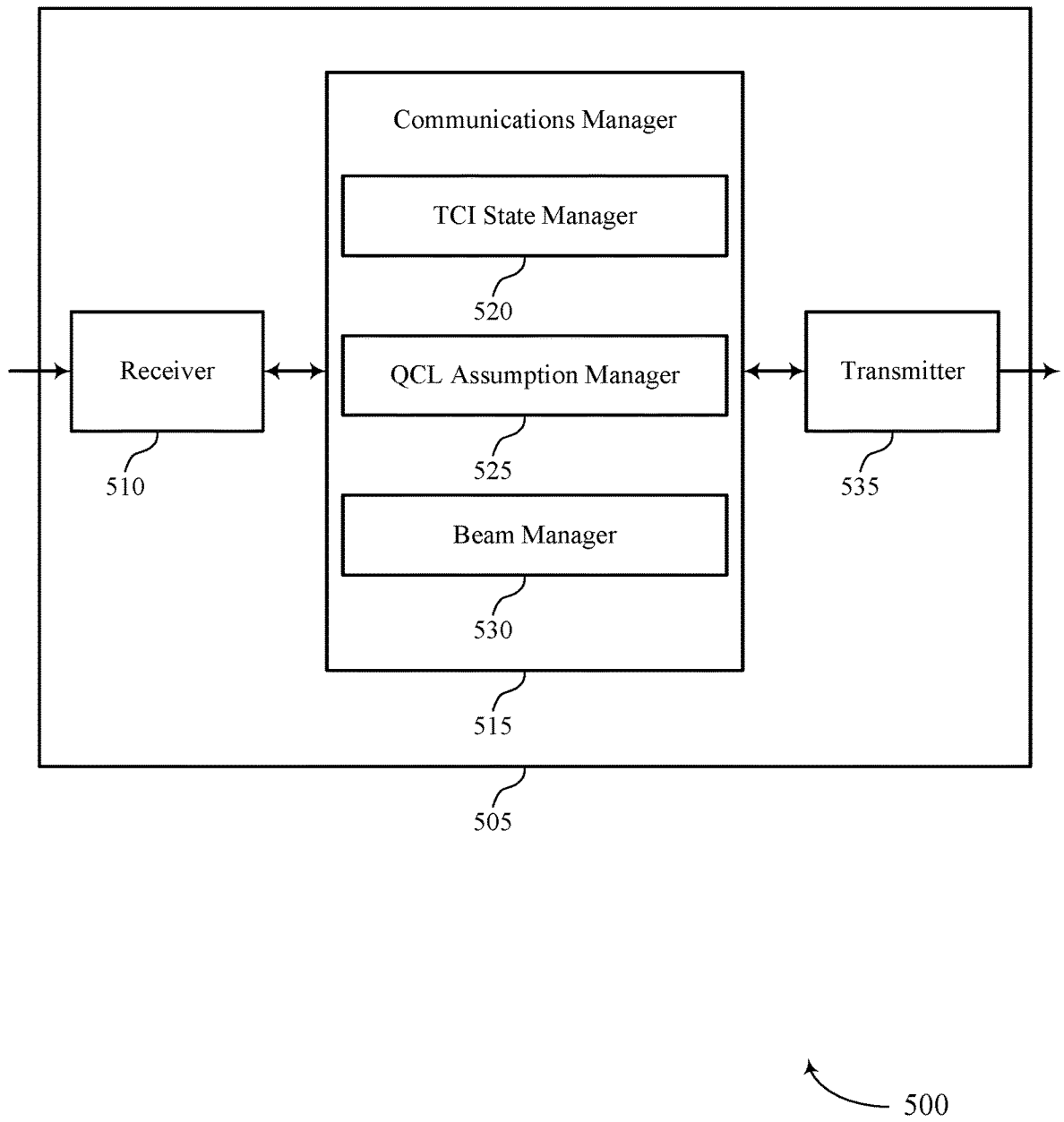

FIG. 5 shows a block diagram 500 of a device 505 that supports active TCI states in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to active TCI states, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a TCI state manager 520, a QCL assumption manager 525, and a beam manager 530. The communications manager 515 may be an example of aspects of the communications manager 710 described herein.

The TCI state manager 520 may receive signaling indicating one or more TCI states corresponding to a first one or more beams. The QCL assumption manager 525 may identify one or more active QCL assumptions corresponding to a second one or more beams that differ from the first one or more beams. The beam manager 530 may monitor for a transmission based on the first one or more beams or the second one or more beams.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
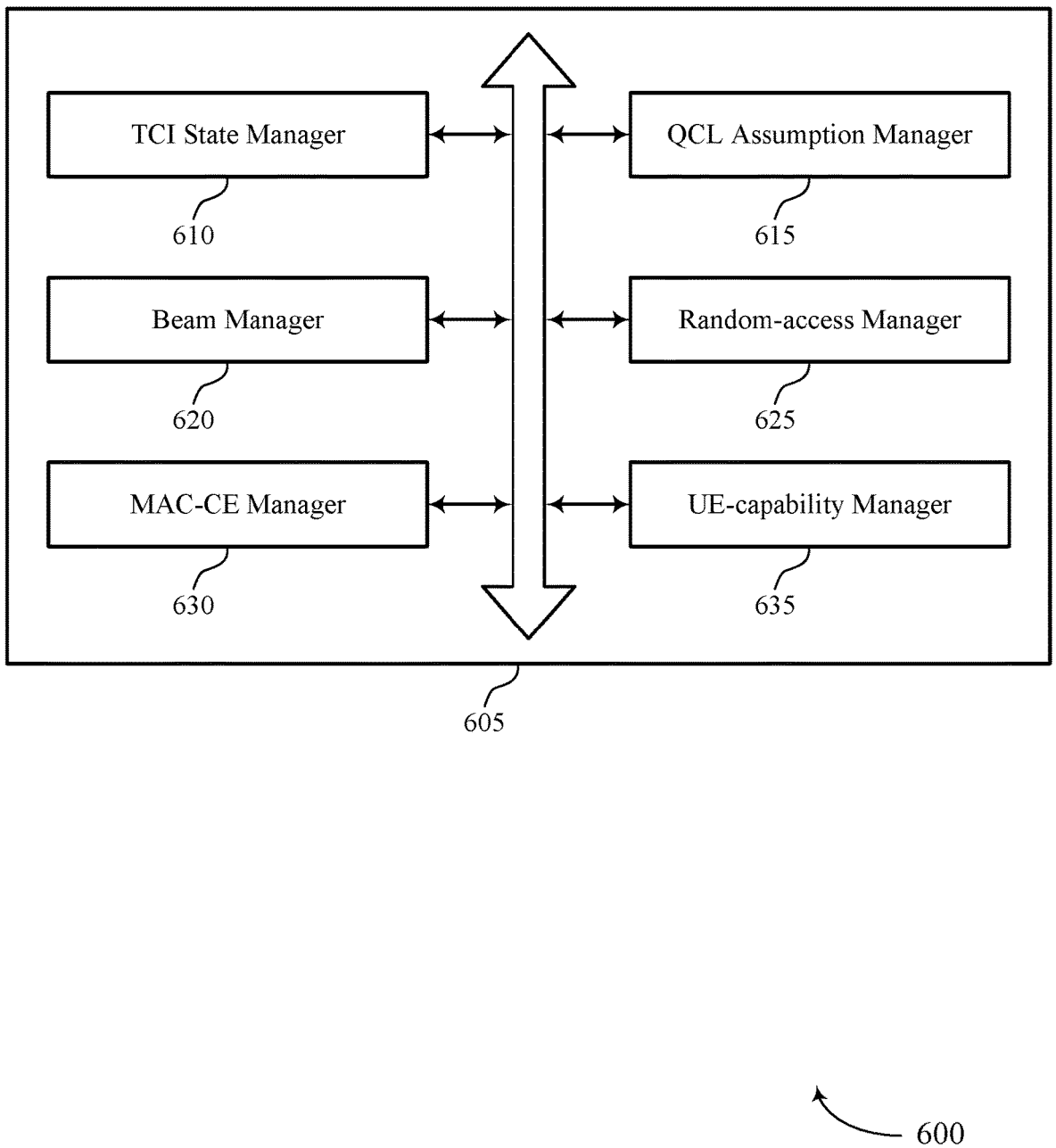
FIG. 6 shows a block diagram of a communications manager that supports active TCI states in accordance with aspects of the present disclosure.

FIG. 6 shows a block diagram 600 of a communications manager 605 that supports active TCI states in accordance with aspects of the present disclosure. The communications manager 605 may be an example of aspects of a communications manager 415, a communications manager 515, or a communications manager 710 described herein. The communications manager 605 may include a TCI state manager 610, a QCL assumption manager 615, a beam manager 620, a random-access manager 625, a MAC-CE manager 630, and an UE-capability manager 635. Each of these modules may communicate, directly or indirectly, with one another (e.g., via one or more buses).

The TCI state manager 610 may receive signaling indicating one or more TCI states corresponding to a first one or more beams. The QCL assumption manager 615 may identify one or more active QCL assumptions corresponding to a second one or more beams that differ from the first one or more beams. The beam manager 620 may monitor for a transmission based on the first one or more beams or the second one or more beams. In some examples, the beam manager 620 may monitor a physical downlink control channel for the transmission. In some examples, the beam manager 620 may monitor a physical downlink shared channel for the transmission.

In some cases, the transmission is a control transmission or a data transmission. In some cases, the second one or more beams are one or more downlink beams or one or more reference signal beams. The random-access manager 625 may select the second one or more beams in a random-access procedure. The MAC-CE manager 630 may receive one or more MAC-CEs indicating the second one or more beams. The UE-capability manager 635 may transmit a capability indicator indicating a number of supported beams, where a number of active TCI states is equal to or less than the number of supported beams indicated by the capability indicator. In some cases, the active TCI states include the indicated one or more TCI states and the identified one or more QCL assumptions.

Figure 7:
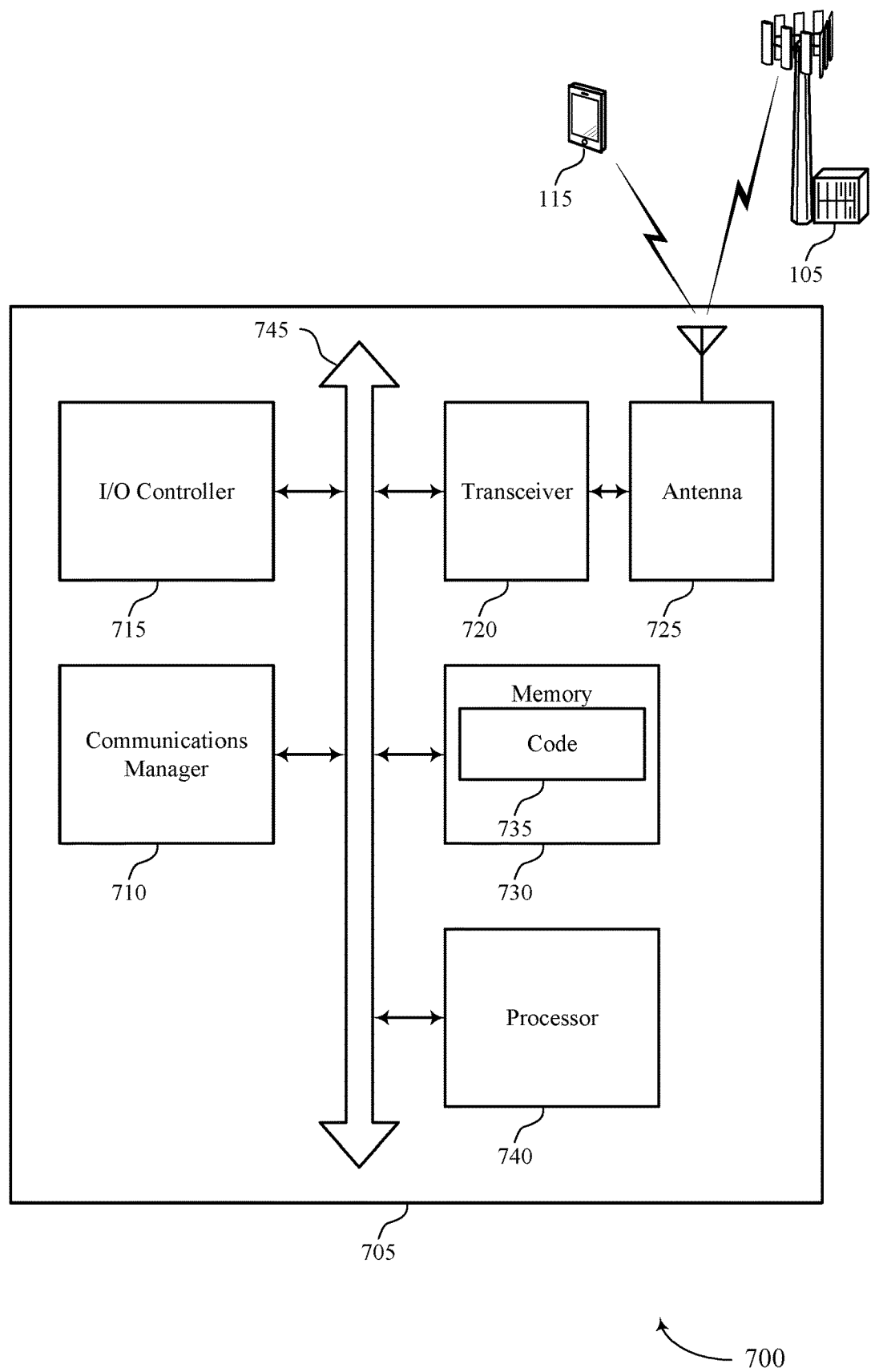
FIG. 7 shows a diagram of a system including a device that supports active TCI states in accordance with aspects of the present disclosure.

FIG. 7 shows a diagram of a system 700 including a device 705 that supports active TCI states in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive signaling indicating one or more TCI states corresponding to a first one or more beams, identify one or more active QCL assumptions corresponding to a second one or more beams that differ from the first one or more beams, and monitor for a transmission based on the first one or more beams or the second one or more beams. The communications manager 710 may be implemented with any combination of processor 740, memory 730, software 735, and transceiver 720, as well as with any other of the described components, to perform the various techniques described herein.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting active TCI states).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
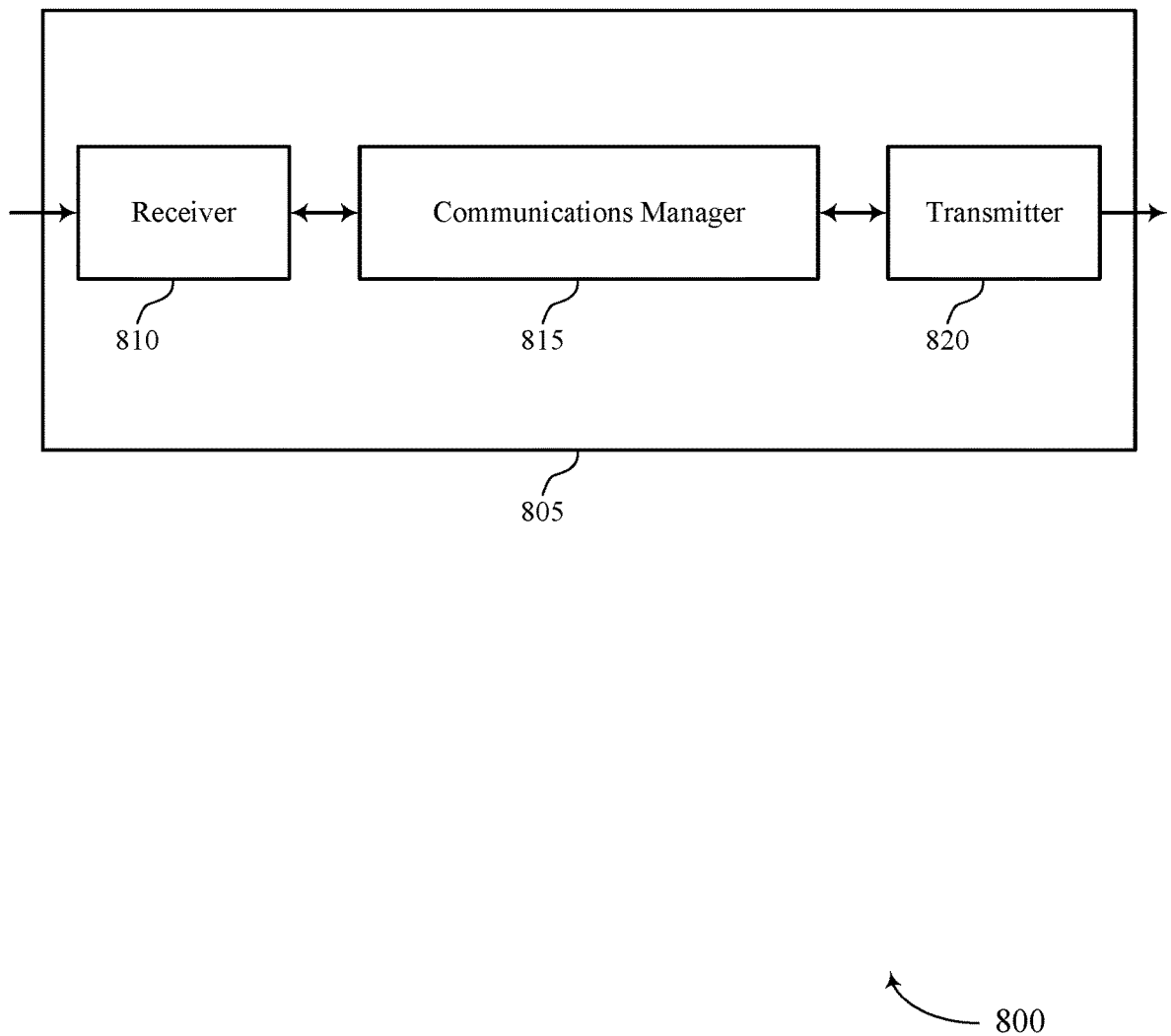
FIGS. 8 and 9 show block diagrams of devices that support active TCI states in accordance with aspects of the present disclosure.

FIG. 8 shows a block diagram 800 of a device 805 that supports active TCI states in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to active TCI states, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit signaling indicating one or more TCI states corresponding to a first one or more beams, identify one or more active QCL assumptions corresponding to a second one or more beams that differ from the first one or more beams, and transmit a transmission based on the first one or more beams or the second one or more beams. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
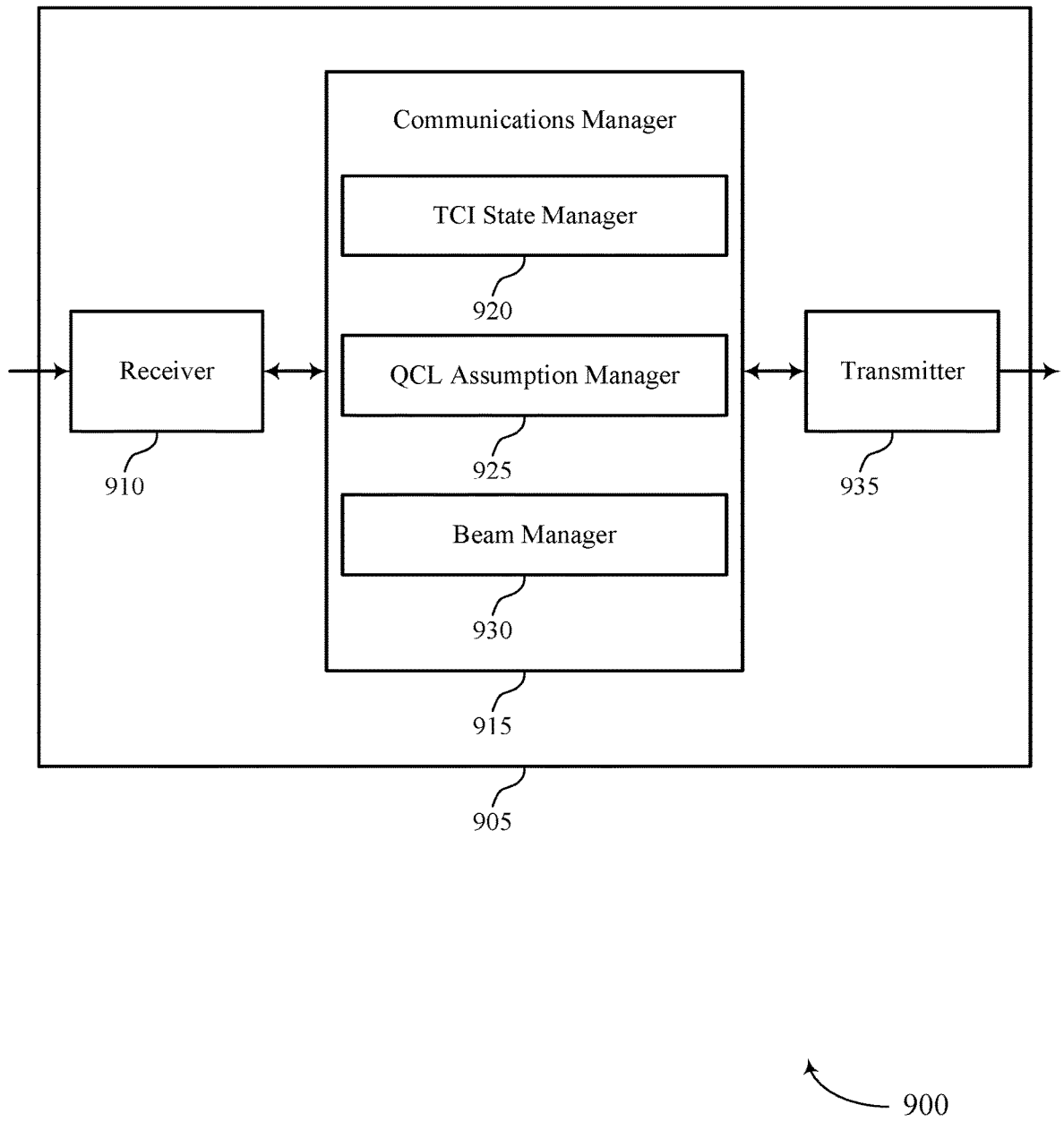

FIG. 9 shows a block diagram 900 of a device 905 that supports active TCI states in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to active TCI states, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a TCI state manager 920, a QCL assumption manager 925, and a beam manager 930. The communications manager 915 may be an example of aspects of the communications manager 1110 described herein.

The TCI state manager 920 may transmit signaling indicating one or more TCI states corresponding to a first one or more beams. The QCL assumption manager 925 may identify one or more active QCL assumptions corresponding to a second one or more beams that differ from the first one or more beams. The beam manager 930 may transmit a transmission based on the first one or more beams or the second one or more beams.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
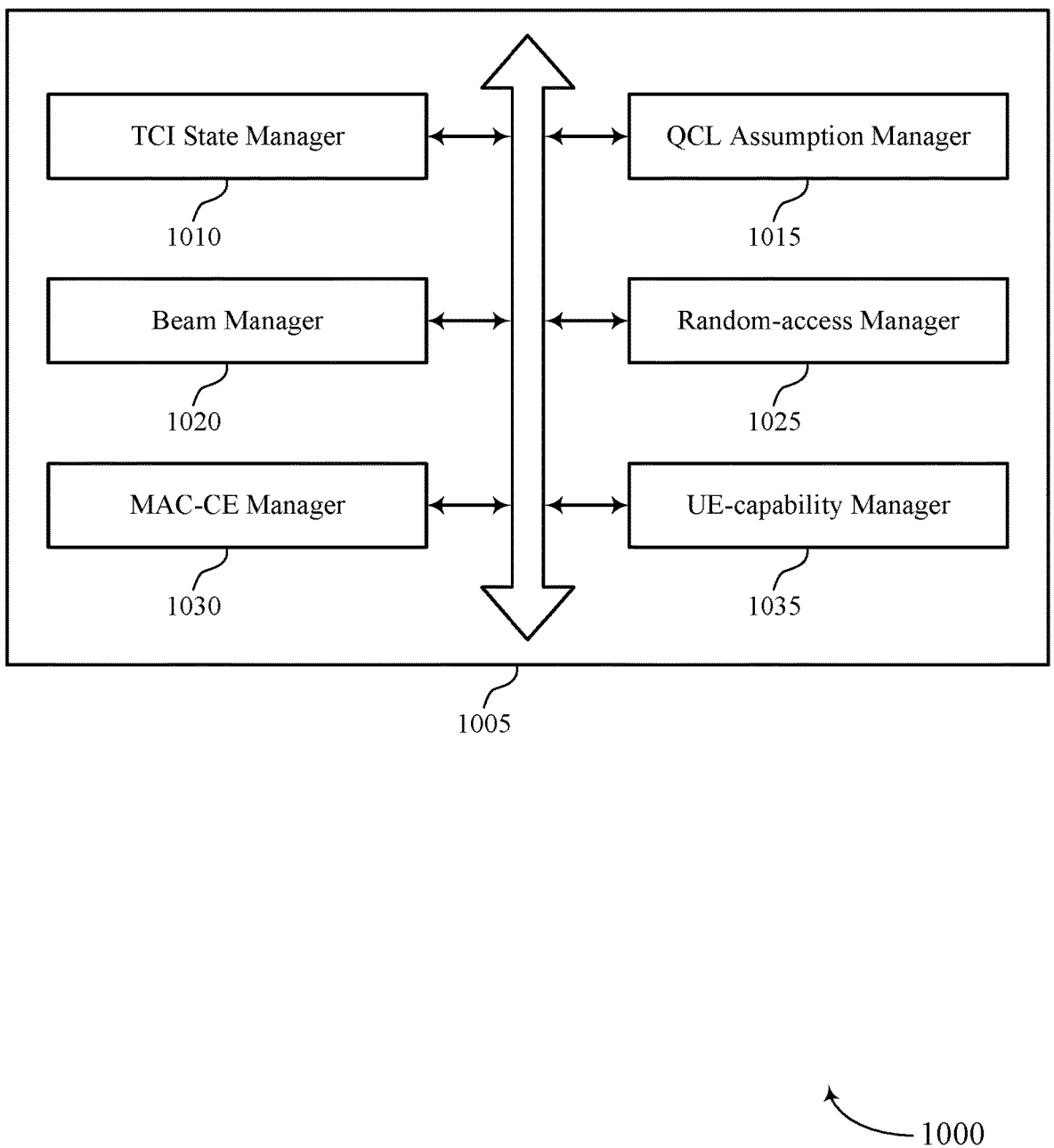
FIG. 10 shows a block diagram of a communications manager that supports active TCI states in accordance with aspects of the present disclosure.

FIG. 10 shows a block diagram 1000 of a communications manager 1005 that supports active TCI states in accordance with aspects of the present disclosure. The communications manager 1005 may be an example of aspects of a communications manager 815, a communications manager 915, or a communications manager 1110 described herein. The communications manager 1005 may include a TCI state manager 1010, a QCL assumption manager 1015, a beam manager 1020, a random-access manager 1025, a MAC-CE manager 1030, and an UE-capability manager 1035. Each of these modules may communicate, directly or indirectly, with one another (e.g., via one or more buses).

The TCI state manager 1010 may transmit signaling indicating one or more TCI states corresponding to a first one or more beams. The QCL assumption manager 1015 may identify one or more active QCL assumptions corresponding to a second one or more beams that differ from the first one or more beams. The beam manager 1020 may transmit a transmission based on the first one or more beams or the second one or more beams. In some examples, the beam manager 1020 may transmit the transmission via a physical downlink control channel. In some examples, the beam manager 1020 may transmit the transmission via a physical downlink shared channel.

In some cases, the transmission is a control transmission or a data transmission. In some cases, the second one or more beams are one or more downlink beams or one or more reference signal beams. The random-access manager 1025 may identify selection of the second one or more beams in a random-access procedure. The MAC-CE manager 1030 may transmit one or more MAC-CEs indicating the second one or more beams. The UE-capability manager 1035 may receive a capability indicator indicating a number of supported beams, where a number of active TCI states is equal to or less than the number of supported beams indicated by the capability indicator. In some cases, the active TCI states include the indicated one or more TCI states and the identified one or more QCL assumptions.

Figure 11:
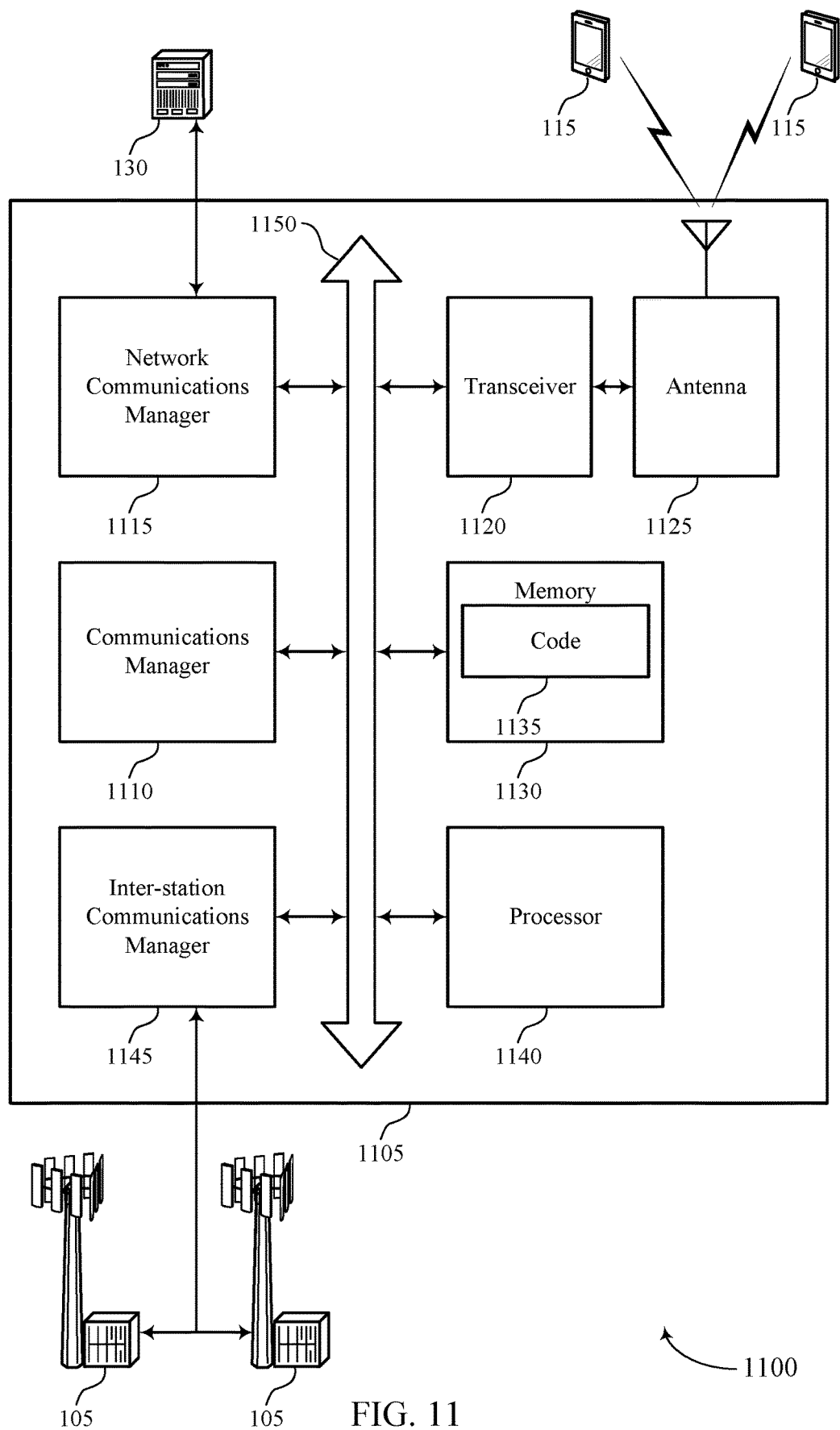
FIG. 11 shows a diagram of a system including a device that supports active TCI states in accordance with aspects of the present disclosure.

FIG. 11 shows a diagram of a system 1100 including a device 1105 that supports active TCI states in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit signaling indicating one or more TCI states corresponding to a first one or more beams, identify one or more active QCL assumptions corresponding to a second one or more beams that differ from the first one or more beams, and transmit a transmission based on the first one or more beams or the second one or more beams. The communications manager 1110 may be implemented with any combination of processor 1140, memory 1130, software 1135, and transceiver 1120, as well as with any other of the described components, to perform the various techniques described herein.

The network communications manager 1115 may manage communications with the core network (e.g., via one or more wired backhaul links). For example, the network communications manager 1115 may manage the transfer of data communications for client devices, such as one or more UEs 115. The network communications manager 1115 may be implemented with any combination of processor 1140, memory 1130, software 1135, and transceiver 1120, as well as with any other of the described components, to perform the various techniques described herein.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting active TCI states).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105. The inter-station communications manager 1145 may be implemented with any combination of processor 1140, memory 1130, software 1135, and transceiver 1120, as well as with any other of the described components, to perform the various techniques described herein.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
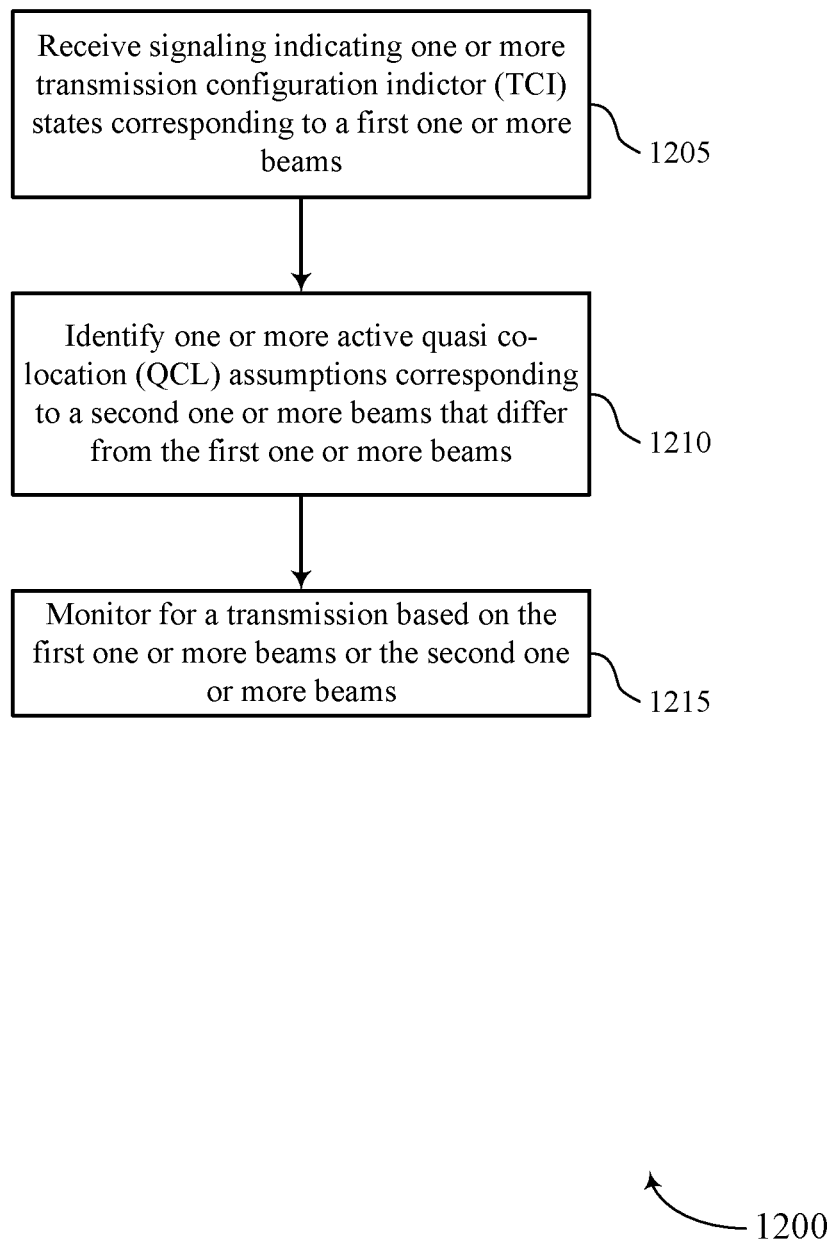
FIGS. 12 and 13 show flowcharts illustrating methods that support active TCI states in accordance with aspects of the present disclosure.

FIG. 12 shows a flowchart illustrating a method 1200 that supports active TCI states in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may receive signaling indicating one or more active TCI states corresponding to a first one or more beams. The operations of 1205 may be performed according to the methods described herein. In some examples, aspects of the operations of 1205 may be performed by a TCI state manager as described with reference to FIGS. 4 through 7. Additionally, or alternatively, means for performing 1205 may, but not necessarily, include, for example, antenna 725, transceiver 720, communications manager 710, memory 730 (including code 735), processor 740 and/or bus 745.

At 1210, the UE may identify one or more active QCL assumptions corresponding to a second one or more beams that differ from the first one or more beams. The operations of 1210 may be performed according to the methods described herein. In some examples, aspects of the operations of 1210 may be performed by a QCL assumption manager as described with reference to FIGS. 4 through 7. Additionally, or alternatively, means for performing 1210 may, but not necessarily, include, for example, antenna 725, transceiver 720, communications manager 710, memory 730 (including code 735), processor 740 and/or bus 745.

At 1215, the UE may monitor for a transmission based on the first one or more beams or the second one or more beams. The operations of 1215 may be performed according to the methods described herein. In some examples, aspects of the operations of 1215 may be performed by a beam manager as described with reference to FIGS. 4 through 7. Additionally, or alternatively, means for performing 1215 may, but not necessarily, include, for example, antenna 725, transceiver 720, communications manager 710, memory 730 (including code 735), processor 740 and/or bus 745.

Figure 13:
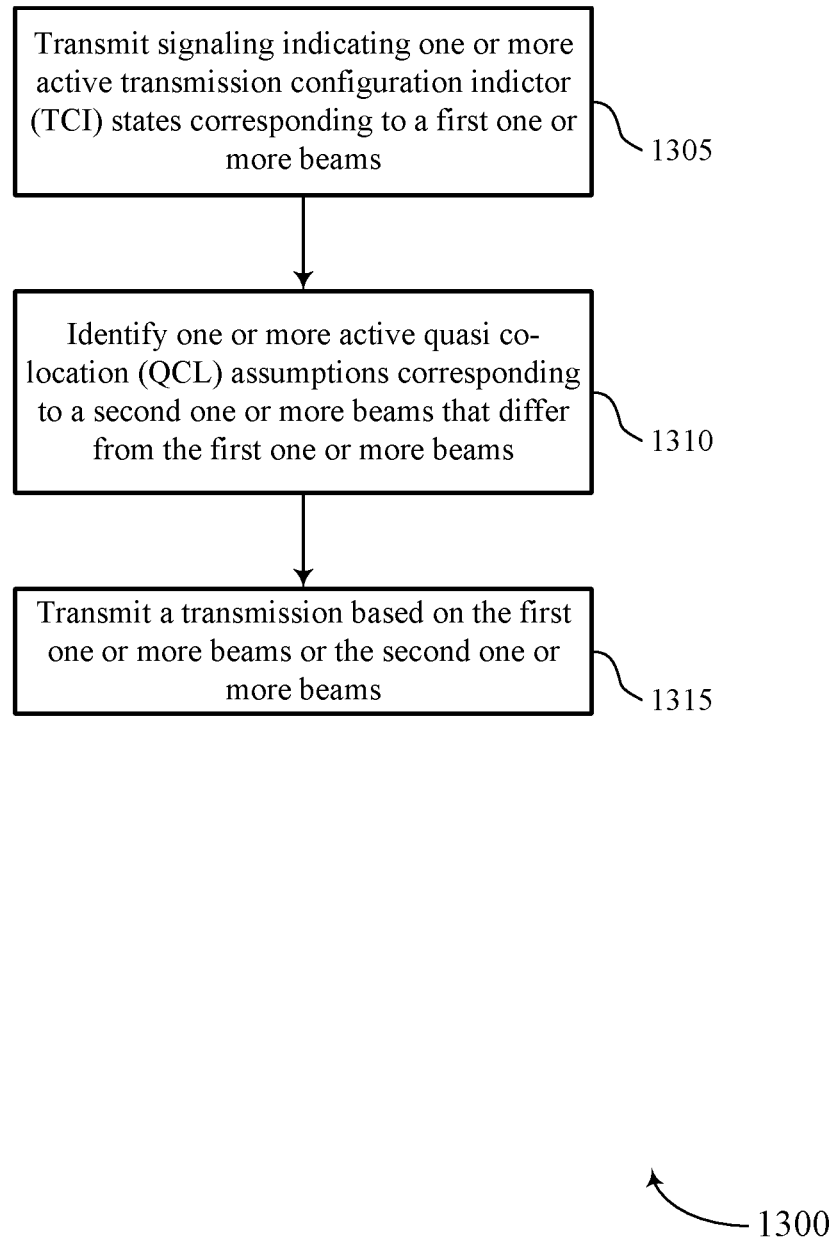

FIG. 13 shows a flowchart illustrating a method 1300 that supports active TCI states in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1305, the base station may transmit signaling indicating one or more TCI states corresponding to a first one or more beams. The operations of 1305 may be performed according to the methods described herein. In some examples, aspects of the operations of 1305 may be performed by a TCI state manager as described with reference to FIGS. 8 through 11. Additionally, or alternatively, means for performing 1305 may, but not necessarily, include, for example, antenna 1125, transceiver 1120, communications manager 1110, memory 1130 (including code 1135), processor 1140 and/or bus 1150.

At 1310, the base station may identify one or more active QCL assumptions corresponding to a second one or more beams that differ from the first one or more beams. The operations of 1310 may be performed according to the methods described herein. In some examples, aspects of the operations of 1310 may be performed by a QCL assumption manager as described with reference to FIGS. 8 through 11. Additionally, or alternatively, means for performing 1310 may, but not necessarily, include, for example, antenna 1125, transceiver 1120, communications manager 1110, memory 1130 (including code 1135), processor 1140 and/or bus 1150.

At 1315, the base station may transmit a transmission based on the first one or more beams or the second one or more beams. The operations of 1315 may be performed according to the methods described herein. In some examples, aspects of the operations of 1315 may be performed by a beam manager as described with reference to FIGS. 8 through 11. Additionally, or alternatively, means for performing 1315 may, but not necessarily, include, for example, antenna 1125, transceiver 1120, communications manager 1110, memory 1130 (including code 1135), processor 1140 and/or bus 1150.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment, comprising:
    transmitting a capability indicator indicating a number of supported beams, wherein a number of active TCI states is equal to or less than the number of supported beams indicated by the capability indicator;
    receiving signaling indicating one or more transmission configuration indicator (TCI) states corresponding to a first one or more beams;
    identifying one or more active quasi co-location (QCL) assumptions corresponding to a second one or more beams that differ from the first one or more beams; and
    monitoring for a transmission based at least in part on the first one or more beams or the second one or more beams.

2. The method of claim 1, wherein the active TCI states comprise the indicated one or more TCI states and the identified one or more QCL assumptions.

3. The method of claim 1, wherein identifying the one or more active QCL assumptions further comprises:
    selecting the second one or more beams in a random-access procedure.

4. The method of claim 1, wherein identifying the one or more active QCL assumptions further comprises:
    receiving one or more medium access control (MAC) control elements (CEs) indicating the second one or more beams.

5. The method of claim 1, wherein the transmission is a control transmission or a data transmission.

6. The method of claim 1, wherein monitoring for the transmission further comprises:

monitoring a physical downlink control channel for the transmission.

7. The method of claim 1, wherein monitoring for the transmission further comprises:
monitoring a physical downlink shared channel for the transmission.

8. The method of claim 1, wherein the second one or more beams are one or more downlink beams or one or more reference signal beams.

9. A method for wireless communication by a base station, comprising:
receiving a capability indicator indicating a number of supported beams, wherein a number of active TCI states is equal to or less than the number of supported beams indicated by the capability indicator;
transmitting signaling indicating one or more transmission configuration indicator (TCI) states corresponding to a first one or more beams;
identifying one or more active quasi co-location (QCL) assumptions corresponding to a second one or more beams that differ from the first one or more beams; and
transmitting a transmission based at least in part on the first one or more beams or the second one or more beams.

10. The method of claim 9, wherein the active TCI states comprise the indicated one or more TCI states and the identified one or more QCL assumptions.

11. The method of claim 9, wherein identifying the one or more active QCL assumptions further comprises:
identifying selection of the second one or more beams in a random-access procedure.

12. The method of claim 9, wherein identifying the one or more active QCL assumptions further comprises:
transmitting one or more medium access control (MAC) control elements (CEs) indicating the second one or more beams.

13. The method of claim 9, wherein the transmission is a control transmission or a data transmission.

14. The method of claim 9, wherein transmitting the transmission further comprises:
transmitting the transmission via a physical downlink control channel.

15. The method of claim 9, wherein transmitting the transmission further comprises:
transmitting the transmission via a physical downlink shared channel.

16. The method of claim 9, wherein the second one or more beams are one or more downlink beams or one or more reference signal beams.

17. An apparatus for wireless communication by a user equipment, comprising: a processor of the user equipment, memory in electronic communication with the processor; and instructions stored in the memory and executable by the processor to cause the apparatus to:
transmit a capability indicator indicating a number of supported beams, wherein a number of active TCI states is equal to or less than the number of supported beams indicated by the capability indicator;
receive signaling indicating one or more transmission configuration indicator (TCI) states corresponding to a first one or more beams;
identify one or more active quasi co-location (QCL) assumptions corresponding to a second one or more beams that differ from the first one or more beams; and
monitor for a transmission based at least in part on the first one or more beams or the second one or more beams.

18. The apparatus of claim 17, wherein the active TCI states comprise the indicated one or more TCI states and the identified one or more QCL assumptions.

19. The apparatus of claim 17, wherein the instructions to identify the one or more active QCL assumptions further are executable by the processor to cause the apparatus to:
select the second one or more beams in a random-access procedure.

20. The apparatus of claim 17, wherein the instructions to identify the one or more active QCL assumptions further are executable by the processor to cause the apparatus to:
receive one or more medium access control (MAC) control elements (CEs) indicating the second one or more beams.

21. The apparatus of claim 17, wherein the transmission is a control transmission or a data transmission.

22. The apparatus of claim 17, wherein the instructions to monitor for the transmission further are executable by the processor to cause the apparatus to:
monitor a physical downlink control channel for the transmission.

23. The apparatus of claim 17, wherein the instructions to monitor for the transmission further are executable by the processor to cause the apparatus to:
monitor a physical downlink shared channel for the transmission.

24. The apparatus of claim 17, wherein the second one or more beams are one or more downlink beams or one or more reference signal beams.

25. An apparatus for wireless communication by a base station, comprising: a processor of the base station, memory in electronic communication with the processor; and instructions stored in the memory and executable by the processor to cause the apparatus to:
receive a capability indicator indicating a number of supported beams, wherein a number of active TCI states is equal to or less than the number of supported beams indicated by the capability indicator;
transmit signaling indicating one or more transmission configuration indicator (TCI) states corresponding to a first one or more beams;
identify one or more active quasi co-location (QCL) assumptions corresponding to a second one or more beams that differ from the first one or more beams; and
transmit a transmission based at least in part on the first one or more beams or the second one or more beams.

26. The apparatus of claim 25, wherein the active TCI states comprise the indicated one or more TCI states and the identified one or more QCL assumptions.

* * * * *